US009206000B1

(12) United States Patent
Hoogestraat

(10) Patent No.: US 9,206,000 B1
(45) Date of Patent: Dec. 8, 2015

(54) BIN SWEEP COLLECTOR RING ASSEMBLY

(71) Applicant: Sudenga Industries, Inc., George, IA (US)

(72) Inventor: Alan G. Hoogestraat, George, IA (US)

(73) Assignee: Sudenga Industries, Inc., George, IA (US)

( * ) Notice: Subject to any disclaimer, the term of this patent is extended or adjusted under 35 U.S.C. 154(b) by 74 days.

(21) Appl. No.: 14/063,513

(22) Filed: Oct. 25, 2013

Related U.S. Application Data

(63) Continuation of application No. 13/030,836, filed on Feb. 18, 2011, now Pat. No. 8,616,823.

(60) Provisional application No. 61/306,322, filed on Feb. 19, 2010.

(51) Int. Cl.
*B65G 65/46* (2006.01)
*B65G 65/48* (2006.01)
*B65G 33/32* (2006.01)

(52) U.S. Cl.
CPC .............. *B65G 65/466* (2013.01); *B65G 33/32* (2013.01); *B65G 65/4836* (2013.01)

(58) Field of Classification Search
CPC ........ B65G 65/00; B65G 65/06; B65G 65/08; B65G 65/10; B65G 65/16; B65G 65/22; B65G 65/30; B65G 65/46; B65G 65/466; B65G 65/4836; B65G 33/32; B65G 2814/0223; B65G 2814/0314; B65G 2814/0319; B65D 88/68; A01F 25/2018

See application file for complete search history.

(56) References Cited

U.S. PATENT DOCUMENTS

| 3,233,755 | A | * | 2/1966 | Glenn | 414/310 |
| 3,449,840 | A | * | 6/1969 | Francis | 34/187 |
| 4,217,701 | A | * | 8/1980 | Mathews | 34/211 |
| 6,017,180 | A | * | 1/2000 | Wilham | 414/305 |
| 2004/0146381 | A1 | * | 7/2004 | Hanson et al. | 414/306 |
| 2006/0104757 | A1 | * | 5/2006 | Schroder et al. | 414/310 |
| 2010/0221090 | A1 | * | 9/2010 | Amick et al. | 414/314 |

* cited by examiner

*Primary Examiner* — Glenn Myers
(74) *Attorney, Agent, or Firm* — James L. Young; Westman, Champlin & Koehler, P.A.

(57) ABSTRACT

In one aspect, the disclosure describes an apparatus comprising an auger section having an auger and a drive unit containing a motor for driving the auger. A collector ring housing containing a collector ring is positioned between the auger section and the drive unit. In another aspect, the disclosure describes an apparatus for attachment to a floor grate. The apparatus includes a pivot stand attached to a top surface of the floor grate, the pivot stand defining a vertical pivot axis. A collector ring has a first stationary portion and a second rotatable portion, with the stationary portion attached to the pivot stand. A housing surrounds the collector ring, and the housing and second rotatable portion of the collector ring rotate together about the pivot axis.

11 Claims, 5 Drawing Sheets

BIN SWEEP COLLECTOR RING ASSEMBLY

CROSS REFERENCE TO RELATED APPLICATION

This application claims the benefit of priority from U.S. patent application Ser. No. 13/030,836, filed Feb. 18, 2011, which is a non-provisional of U.S. Provisional Patent Application Ser. No. 61/306,322, filed Feb. 19, 2010 to a "Bin Sweep Collector Ring Assembly," which is hereby incorporated by reference in its entirety.

BACKGROUND

This invention relates to bin sweeps for moving and clearing of grain and other materials from silos, grain bins and similar storage units. Specifically, this invention relates to a collector ring or slip ring assembly that connects the drive motor unit and the auger section to a pivot stand.

A grain bin sweep is generally found at the bottom of a grain bin containing a flat bottom floor. Typically, the grain bin has a circular horizontal cross-section. Diameters of grain bins vary from several feet to over one hundred feet. A grain sweep typically covers the radius of the bin so that it is able to sweep the entire area of the bin as it rotates about an axis in the center of the grain bin.

To remove the stored material from a grain bin, a central opening at the bottom of the grain bin is opened to allow the grain to flow through by gravity. The grain flows like a viscous fluid much like the sand in an hourglass. Grain will flow into the floor opening until flow from gravity stops, leaving grain at the sides of the bin resting at the angle of repose. The empty space in the bin is the shape of an inverted cone with the point at the floor opening and the circular base at the top level of the remaining grain. The grain remaining in the bin must be removed. The bin sweep in a grain bin removes the remaining grain or other stored material that will not be moved by gravity alone.

A bin sweep typically includes an auger that rotates about a horizontal axis for conveying grain that is lying on the floor of the grain bin toward the central floor opening or sump. The auger of the bin sweep extends from the center of the bin to the bin's circumference and is mounted adjacent to the central opening, usually through the use of some means to provide that the bin sweep may pivot around an axis at the central floor opening. The bin sweep conveys grain toward the central floor opening as it gradually travels on an angular path within the grain bin, eventually traveling over the entire floor surface of the grain bin.

A power source such as an electric motor is mounted to the central structure for supplying rotational power to the auger. Additionally, a driving means is typically used with the bin sweep for propelling the auger section about the central opening in the floor, and commonly includes wheels or a track drive that will establish traction on the floor of the grain bin. A slip ring, also called a collector ring, is typically used as a rotary coupling to transfer electric current from a stationary unit to a rotating unit. In the current state of the art, a slip ring housing is typically contained within the central sump, below the floor level of the bin. Thus, installation and maintenance of the slip ring are difficult because of constraints on accessibility. Moreover, the sump must be of an adequate depth to contain the slip ring housing. This requires the floor level in the bin to be at a certain height, thereby reducing the effective storage capacity of the bin.

SUMMARY

In one aspect, the disclosure describes an apparatus comprising an auger section having an auger and a drive unit containing a motor for driving the auger. A collector ring housing containing a collector ring is positioned between the auger section and the drive unit.

In another aspect, the disclosure describes an apparatus for attachment to a floor grate. The apparatus comprises a pivot stand attached to a top surface of the floor grate, the pivot stand defining a vertical pivot axis. A collector ring has a first stationary portion and second rotatable portion, with the stationary portion attached to the pivot stand. A housing surrounds the collector ring, and the housing and second rotatable portion of the collector ring rotate together about the pivot axis.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 1:
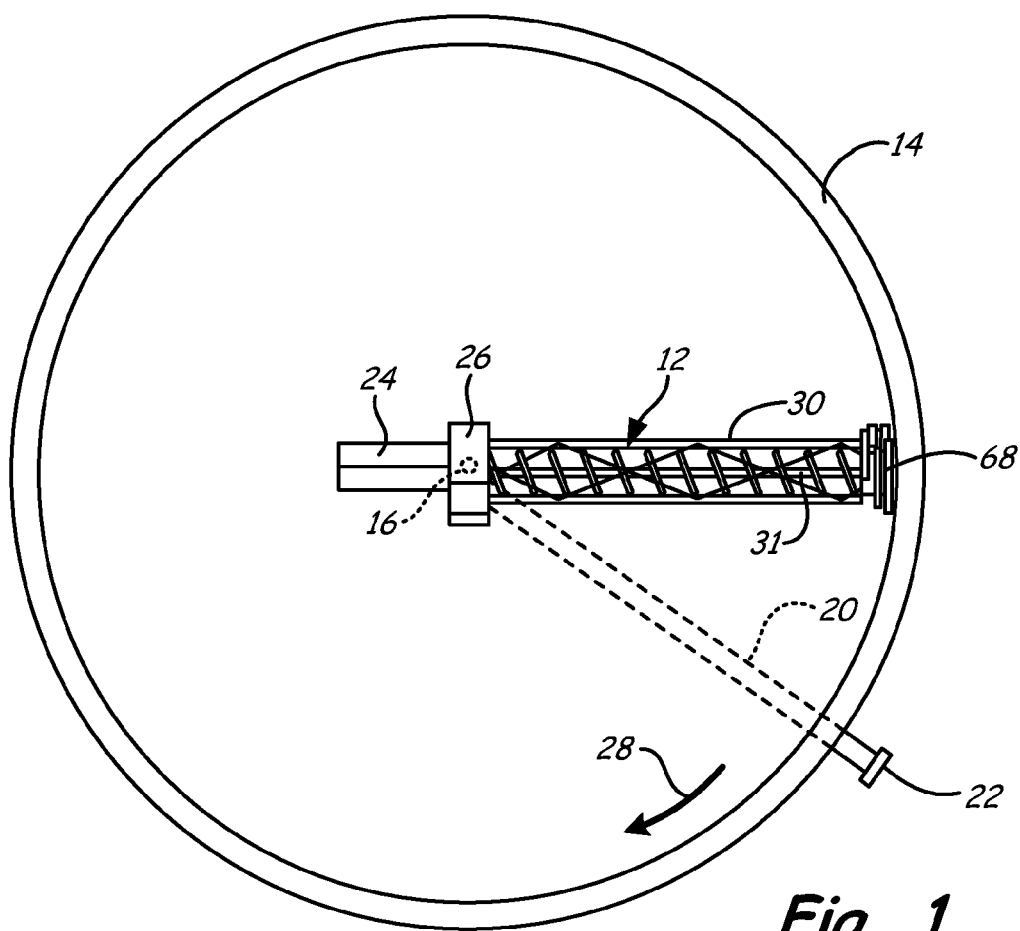
FIG. 1 is a top view of a bin sweep within a bin incorporating a collector ring assembly according to the present disclosure.
Figure 2:
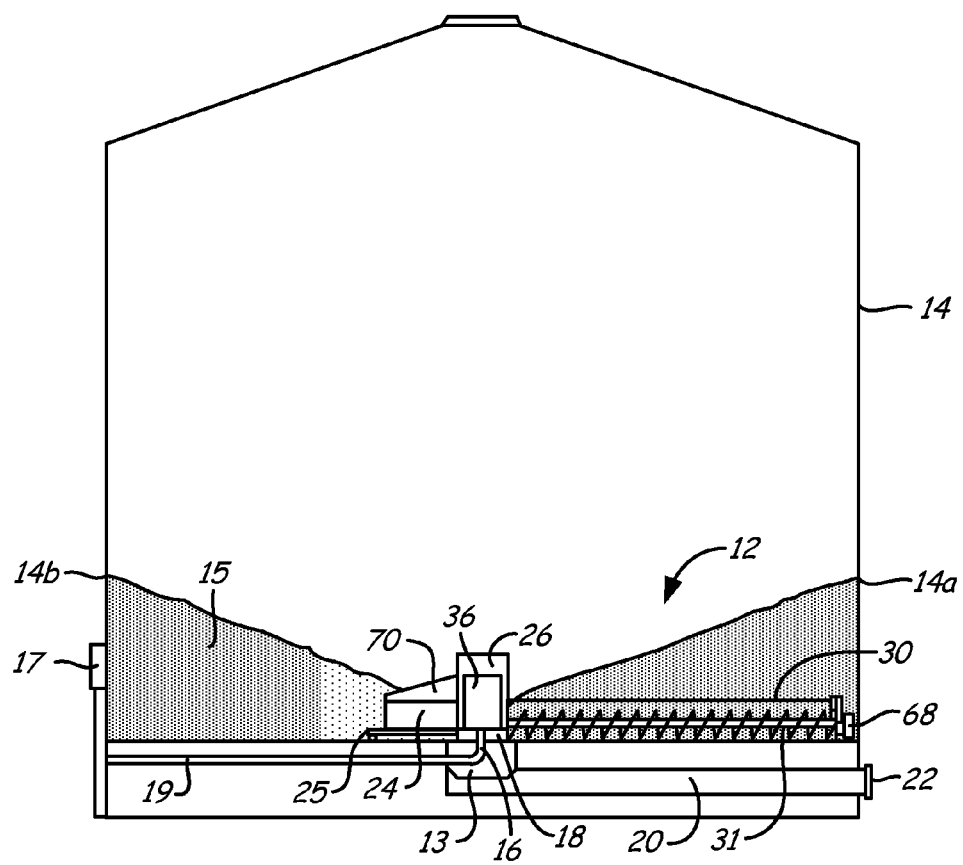
FIG. 2 is a side view of a bin sweep within a bin incorporating a collector ring assembly according to the present disclosure.

FIG. 1 shows a top view of a bin sweep 12 as it would appear in use in grain bin 14. Grain bin 14 is a storage facility that is typically cylindrical with a flat floor, as is well known within the art. Bin sweep 12 rotationally moves around a vertical, central pivot axis 16, such as along path 28. As shown in FIG. 2, bin sweep 12 conveys grain in the grain bin 14 from the outer circumference of grain bin 14 to center sump hopper 13 located at a floor opening 18. Typically, floor opening 18 is centrally located within the grain bin 14. Upon reaching floor opening 18, the contents of the grain bin 14 drop into center sump hopper 13 and onto a conveyor 20 for transport out of grain bin 14. Typically, conveyor 20 is a screw auger within an enclosed tube. The screw auger transports the stored grain through conveyor 20 to a discharge opening 22.

Auger section 30 of bin sweep 12 extends radially out from central pivot axis 16 towards the edge of grain bin 14. As illustrated in FIG. 2, stored material 15 has been emptied to a point where the stored material 15 has come to rest at the angle of repose. At this point of unloading grain bin 14, it is necessary to engage bin sweep 12 so that auger 31 may remove the stored material 15 from the outer edges 14a and 14b of grain bin 14. In one embodiment, auger 31 is comprised of a central rod or pipe with a sized helical flighting attached thereto, as is common in the art (and shown), although any linear conveyor apparatus may suffice for this purpose. The length of the auger 31 is nominally that of the radius of grain bin 14. Auger 31 turns about a horizontal axis to convey stored material 15 from outer edges 14a and 14b to floor opening 18, which leads to center sump hopper 13. Suitable constructions of auger section 30 are disclosed in commonly assigned U.S. Patent Application Publications 2005/0254922 and 2010/0239399, which are hereby incorporated by reference.

Also shown in FIG. 2 is a control panel 17 connected to a power line 19. Power line 19 in an exemplary embodiment is an electrical line that has been tapped into an electrical utility service providing power to the location of grain bin 14. The control panel 17 contains basic electrical components for running the bin sweep 12. In one embodiment, the control panel 17 comprises at least one current sensing relay; a plurality of indicator lights showing power to components of the bin sweep 12; a switch for setting a feedback system between three settings of (off), (manual), and (automatic); and a master power switch to engage and disengage power to the bin sweep 12. The control panel 17 also includes a forward/reverse switch for the motor that advances the bin sweep 12 around the grain bin 14 (tractor drive unit 68).

The power line 19 extends from the control panel 17 to the motors of the drive unit 24 and tractor drive unit 68. Drive unit 24 turns auger 31; tractor drive unit 68 advances auger section 30 around the bin 14 in direction 28, as depicted in FIG. 1. In one embodiment, power line 19 is a flexible metal conduit containing circuit wires encased in dielectric insulation, or a similar structure. In one embodiment, the power line 19 runs in a conduit that extends from the ground and terminates at control panel 17 along the side of grain bin 14. Power line 19 also runs in this conduit below the grain bin floor and extends through the floor proximate the central pivot axis 16. In an exemplary embodiment, power line 19 extends through pivot stand 32, shown in FIGS. 3-5. In an exemplary embodiment, the power line 19 contains two separate cables shown in FIG. 4: cable 21 providing power to drive unit 24 and cable 23 providing power tractor drive unit 68. In an exemplary embodiment, each cable 19, 21, 23 is an insulated cable containing jacketed wires capable of carrying electrical current to run electrical motors, which is common in the art.

Bin sweep 12 has a drive unit 24 connected at a first end. Dolly 25 supports drive unit 24 above floor opening 18. Jack 29 provides adjustability of the height of dolly 25 relative to the floor of the grain bin 14. Casters 27 on the dolly 25 permit rotational movement about pivot axis 16. A collector ring housing 26 is positioned at central pivot axis 16 and connects drive unit 24 to auger section 30. Drive unit 24 comprises an auger motor encased in a protective motor cover assembly. The auger motor in an exemplary embodiment is an electric motor connected to wiring that allows for control of the motor from the exterior of grain bin 14. The auger motor provides power to turn an auger 31 of auger section 30 about a generally horizontal axis as the bin sweep 12 moves through the grain bin 14.

Collector ring housing 26 is mounted to pivot stand 32, which is fixedly attached, such as by bolts, to the top surface of a center grate 34 at floor opening 18. In an exemplary embodiment, such a grate 34 is integrally formed with center sump hopper 13. Collector ring housing 26 contains and protects slip ring or collector ring 36 (see FIGS. 4 and 5). Collector rings are typically used as rotary couplings to transfer electric current from stationary units to rotating units. Each collector ring includes a stationary portion and a rotatable portion. Various types of collector rings may be used; for example, those using electrical current or hydraulic power; three-phase or single phase; and those configured for different sizes, voltages, and number of connections.

Figure 3:
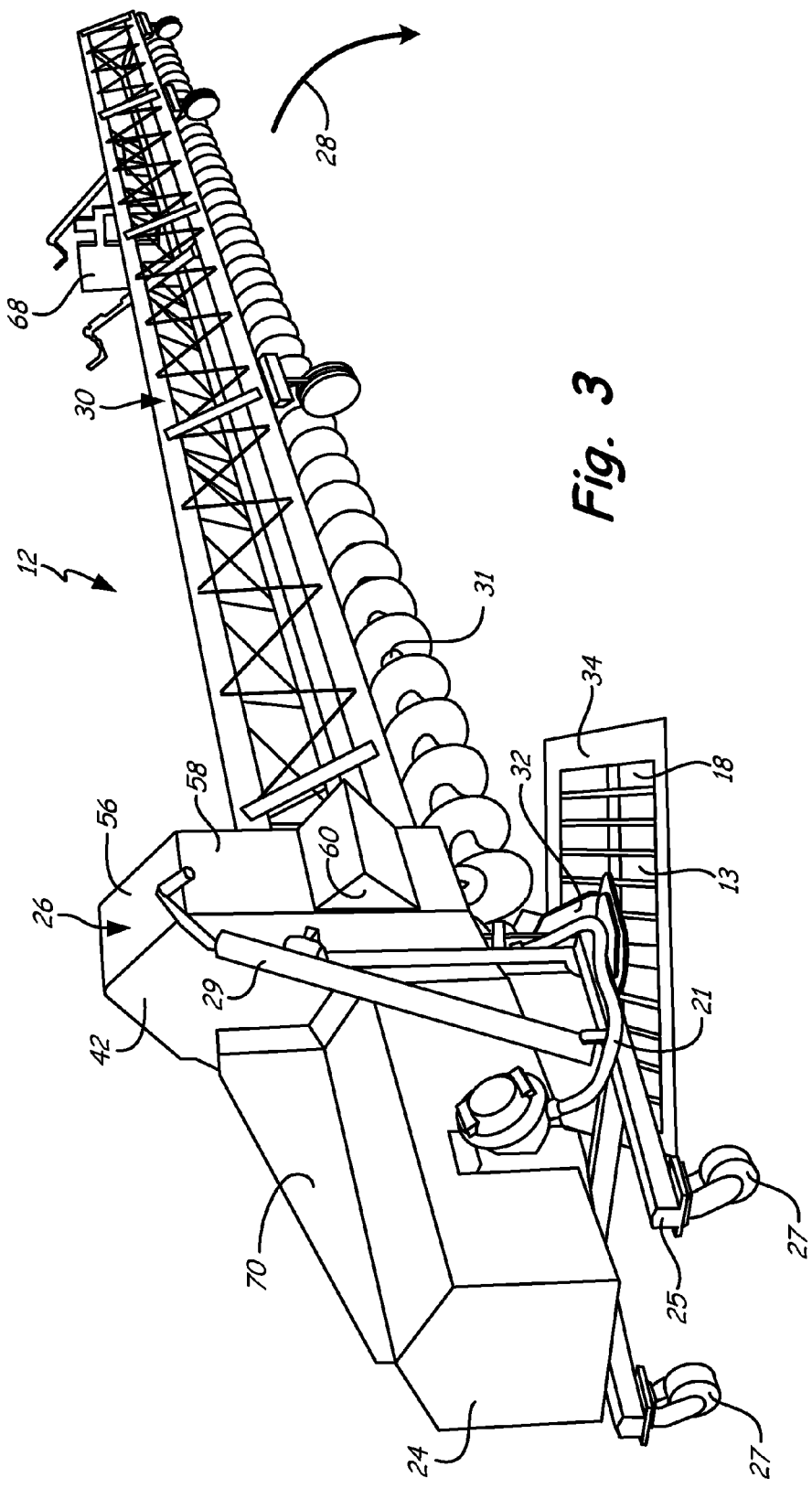
FIG. 3 is a perspective view of a bin sweep incorporating a collector ring assembly according to the present disclosure.
Figure 4:
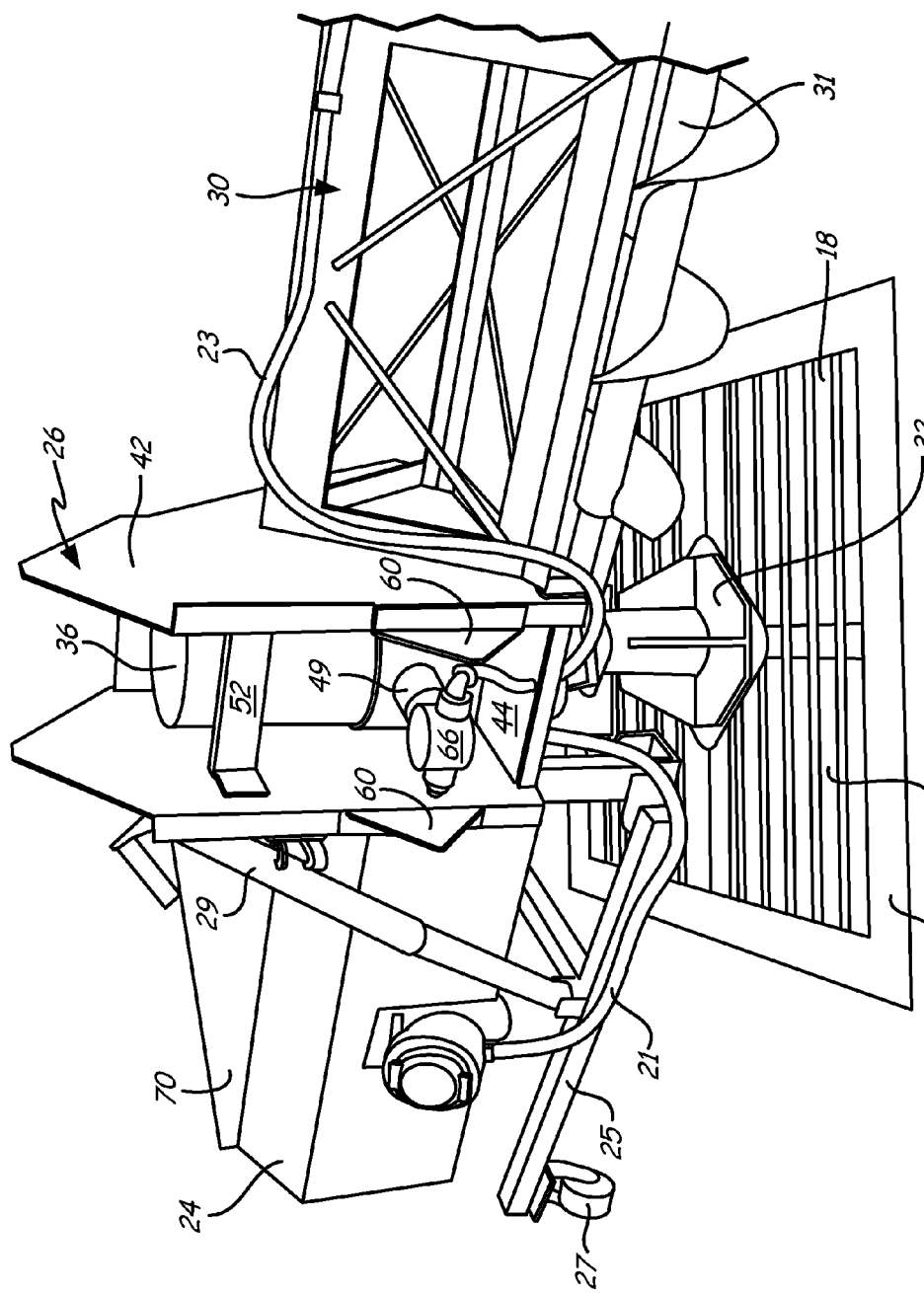
FIG. 4 is another perspective view of a collector ring assembly with the housing cover removed, according to the present disclosure.
Figure 5:
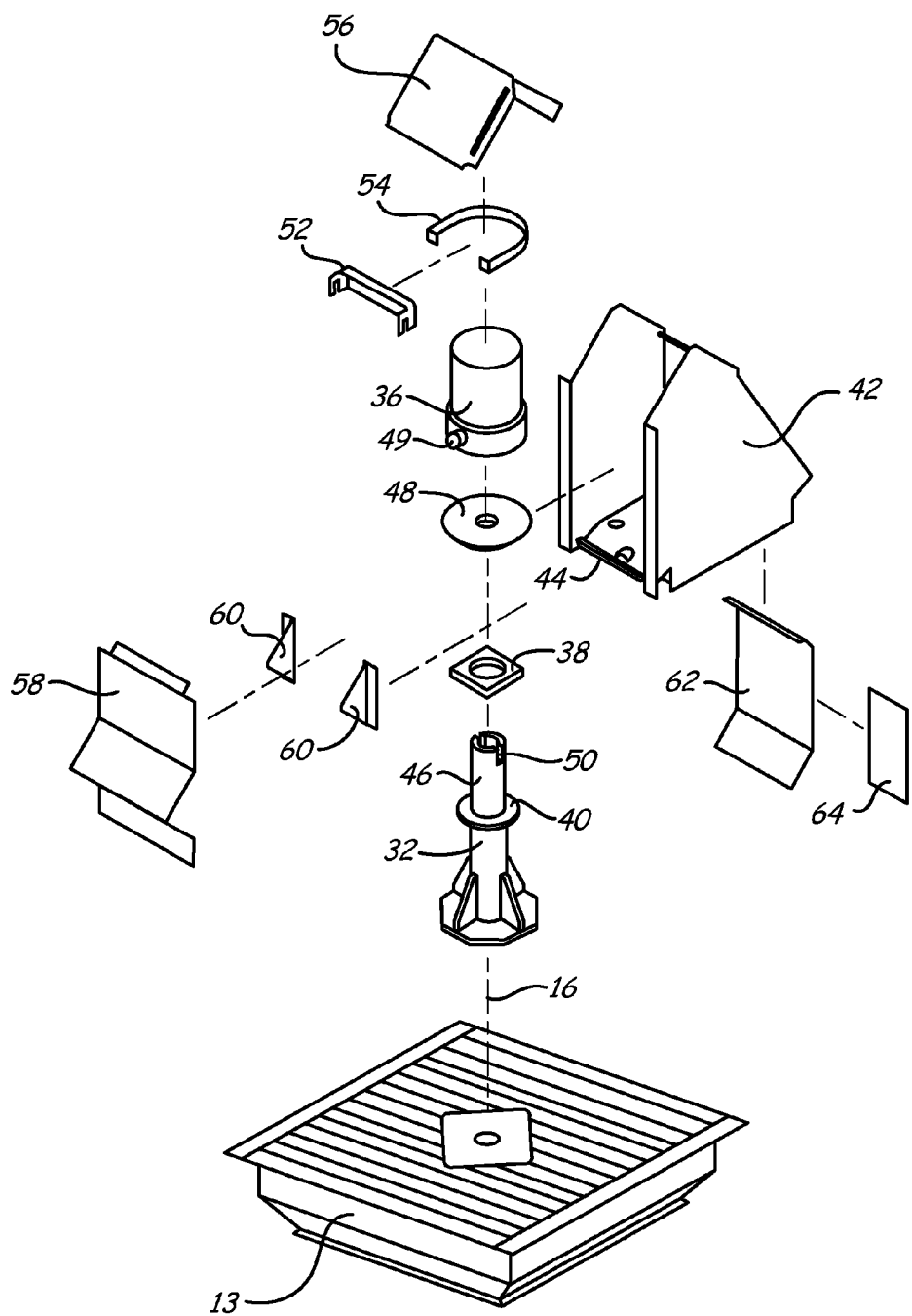
FIG. 5 is an exploded view of a collector ring pivot stand and housing assembly according to the present disclosure.

The construction of collector ring housing 26 is illustrated in FIGS. 3-5. Pivot stand 32 defines central pivot axis 16. Pivot stand 32 is typically bolted onto the center grate 34 of center sump hopper 13, which is anchored to the floor. In another embodiment, a pivot stand is integrally formed with grate 34 of center sump hopper 13. Either of these constructions results in a simple, robust pivot arrangement for the bin sweep 12. This arrangement leads to far fewer operational problems as compared to a configuration in which a pivot is mounted on top of another moving part such as a collector ring. While a particular configuration for pivot stand 32 is illustrated, other sizes and arrangements for a pivot stand can be used to accommodate different requirements.

Sweep pivot bearing 38 is placed onto pivot stand 32 so that it rests upon flange 40. Main housing section 42 has a bore in the bottom plate 44 thereof to allow a top portion 46 of pivot stand 32 to pass therethrough; thus, the bottom plate 44 of main housing section 42 sits on top of sweep pivot bearing 38 and the top portion 46 extends above the bottom plate 44. Slip ring support plate 48 is inserted into main housing section 42 and has keys that engage slots 50 in top portion 46 of pivot stand 32 (so as to be non-rotatable about central pivot axis 16). As is conventional, collector ring 36 has a casing (its rotatable portion) and a plate (its stationary portion). The plate of the collector ring 36 is secured onto the slip ring support plate 48 (so as to be non-rotatable about central pivot axis 16). Cable 21 is electrically coupled to the plate of the collector ring 36 via coupling 49 thereon (see FIG. 4). The mounting of slip ring support plate 48 on pivot stand 32 allows for flexibility and adjustability of operation as bin sweep 12 follows the contours of the floor of grain bin 14. The casing of collector ring 36 is held within collector ring housing 26 by cross bar 52 and band 54 so that the case of collector ring 36 and collector ring housing 26 are connected together for coupled rotation about central pivot axis 16. In addition to main housing section 42, other housing shield members include top cover 56, front cover 58, side fillers 60, back shield 62 and splice plate 64. In an exemplary embodiment, front cover 58 and side fillers 60 are configured to allow space for electrical junction 66, shown in FIG. 4. The collector housing 26 thus surrounds and protects the collector ring 36 and its connections from contact with the stored material 15 in the bin 14. In a disclosed embodiment, collector ring housing 26 comprises multiple removable panels, thereby allowing selective access while still protecting the collector ring 36 and its associated connections, including, e.g., cables.

The housing elements of the disclosure are configured to facilitate the flow of stored material 15 around the housing as the stored material 15 moves from the grain bin 14 into the center sump hopper 13. For example, drive unit 24 has a material diversion fin 70 to prevent accumulation of stored material on top of drive unit 24 (see FIGS. 2, 3 and 4). Moreover, the cover of drive unit 24, top cover 56, front cover 58 and back shield 62 are peaked and sloped to facilitate material flow.

Bin sweep 12 has a tractor drive unit 68 to support a second end of bin sweep 12 and push auger section 30 radially around grain bin 14 on path 28 shown in FIG. 1. A suitable tractor drive implementation is disclosed in commonly assigned U.S. Patent Application Publication 2005/0263372, which is hereby incorporated by reference.

With the disclosed collector ring assembly, the collector ring 36 is housed above the floor level and is therefore easily accessible for installation and maintenance. Further, because the center sump hopper 13 need not be deep enough to contain the collector ring 36, the floor level need not be as high above grade as is typical. The provision of a shallower center sump hopper and its allowance for a lower floor reduces tank material and construction costs and also provides more overhead clearance and storage capacity in the grain bin 14. In an exemplary embodiment, center sump hopper 13 is about 16 inches deep and has a square floor opening that is about 34 inches long on each side. While a particular configuration for center sump hopper 13 is illustrated, other sizes and arrangements can be used to accommodate different requirements. Existing bin sweeps can be easily retrofitted with the modular elements of the collector ring assembly disclosed herein, including but not limited to pivot stand 32, floor grate 34, sweep pivot bearing 38, collector ring housing 26, slip ring drive 48, and collector ring 36.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus for use above a floor grate, the apparatus comprising:
    a pivot pipe extending above a top surface of the floor grate, the pivot pipe defining a vertical pivot axis;
    a collector ring having a first stationary portion and a second rotatable portion, wherein the stationary portion is attached to the pivot pipe above the floor grate;
    a sweep mechanism configured to move in an arc about the vertical pivot axis, the sweep mechanism having first and second ends, wherein the first end is positioned proximate the collector ring;
    a slip ring support plate supported on the pivot pipe, wherein the slip ring support plate supports the first stationary portion;
    a flange supported on the pivot pipe, wherein the flange supports the slip ring support plate; and
    a first drive unit positioned proximate the first end of the sweep mechanism, the first drive unit containing a first motor for driving the sweep mechanism, wherein the first drive unit and second rotatable portion of the collector ring rotate together about the pivot axis.

2. The apparatus of claim 1 wherein the slip ring support plate is attached to a top portion of the pivot pipe, and the apparatus further comprising a pivot bearing positioned below the slip ring support plate on the pivot pipe.

3. The apparatus of claim 2 further comprising a housing surrounding the collector ring, wherein the housing has a bottom plate, and wherein the bottom plate is positioned below the slip ring support plate on the pivot pipe.

4. The apparatus of claim 3 wherein the housing comprises a peaked top cover.

5. The apparatus of claim 3 wherein the housing is attached to the first drive unit.

6. The apparatus of claim 3 wherein the pivot bearing is positioned below the bottom plate on the pivot pipe.

7. The apparatus of claim 6 wherein the pivot bearing rests on the flange.

8. The apparatus of claim 1 wherein the first drive unit has a material diversion fin thereon.

9. The apparatus of claim 1 further comprising a tractor drive unit having a second motor for moving the second end of the sweep mechanism in the arc.

10. The apparatus of claim 1 wherein the sweep mechanism comprises an auger.

11. An apparatus for use above a floor grate, the apparatus comprising:
    a pivot pipe extending above a top surface of the floor grate, the pivot pipe defining a vertical pivot axis;
    a collector ring having a first stationary portion and a second rotatable portion, wherein the stationary portion is attached to the pivot pipe above the floor grate;
    a sweep mechanism configured to move in an arc about the vertical pivot axis, the sweep mechanism having first and second ends, wherein the first end is positioned proximate the collector ring;
    a first drive unit positioned proximate the first end of the sweep mechanism, the first drive unit containing a first motor for driving the sweep mechanism, wherein the first drive unit and second rotatable portion of the collector ring rotate to together about pivot axis;
    a slip ring support plate attached to a top portion of the pivot pipe;
    a pivot bearing positioned below the slip ring support plate on the pivot pipe; and
    a housing surrounding the collector ring, wherein the housing has a bottom plate, and wherein the bottom plate is positioned below the slip ring support plate on the pivot pipe, wherein the housing is attached to the first drive unit on one side of the housing, and the housing is attached to the sweep mechanism on another side of the housing.

* * * * *